Patented Oct. 5, 1948

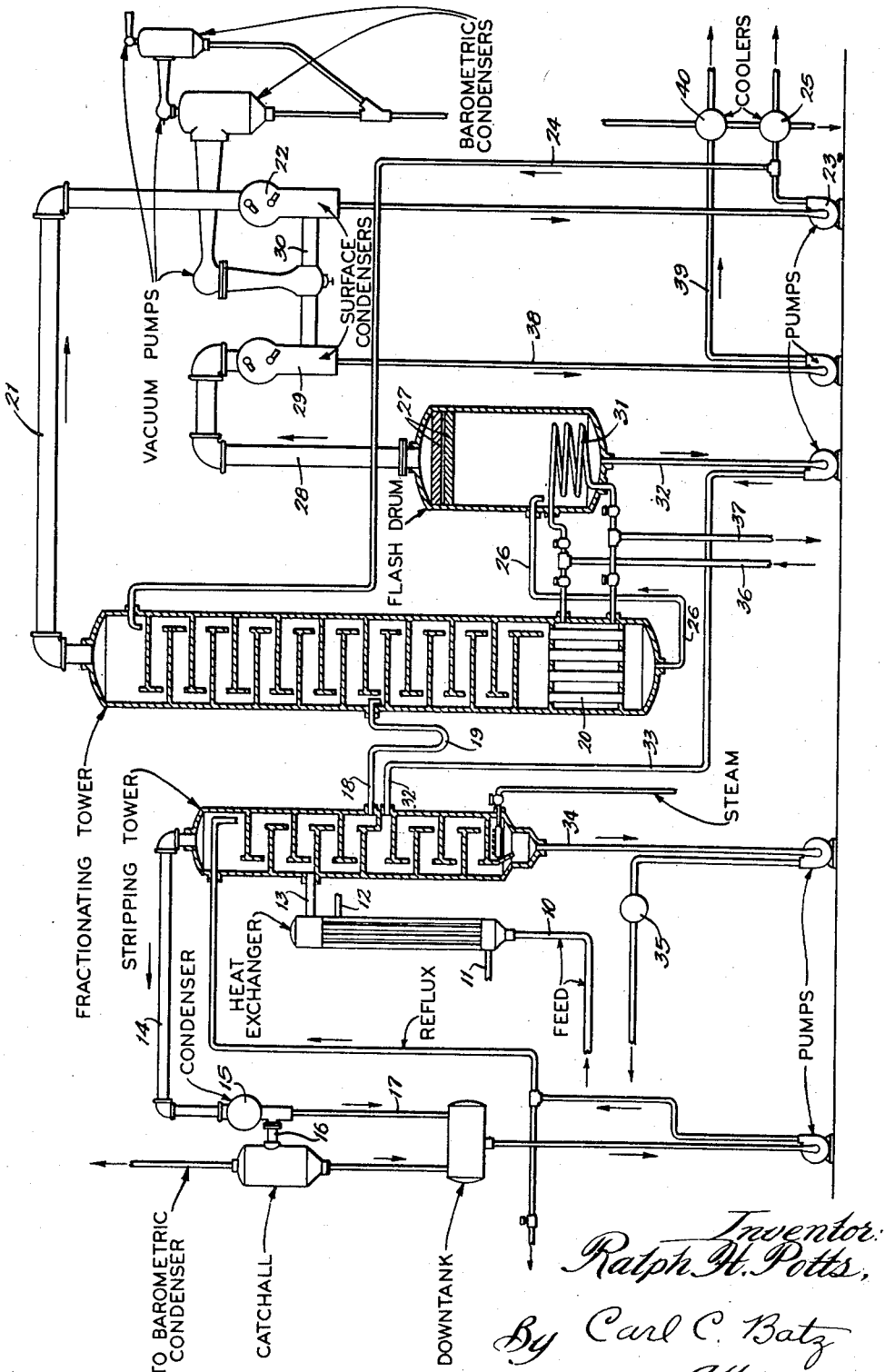

2,450,612

UNITED STATES PATENT OFFICE 2,450,612

DISTILLATION OF FATTY ACID STOCK BY FRACTIONATION AND FLASH STEPS

Ralph H. Potts, La Grange, Ill., assignor to Armour and Company, Chicago, Ill., a corporation of Illinois Application December 16, 1941, Serial No. 424,434, which is a division of application Serial No. 298,722, October 9, 1939. Divided and this application February 10, 1945, Serial No. 577,247

13 Claims. (Cl. 202—51)

This invention relates to treating fatty acid-containing stock and the like. The new method will be found to be applicable to other uses.

It is now common practice to pass fatty acid-containing stock through a pipe still and thence into a fractionating tower, steam being employed in the bottom of the tower for stripping the bottoms, the steam and the uncondensed portion of the stripped vapors passing up and out of the tower. This process has several disadvantages. The volume of the steam, air and other gases introduced with the feed stock makes it difficult to maintain the desired high vacuum. Furthermore, the ascending steam and gases, by reason of molecular weight differences and through entrainment, militate against sharp separation of the fractions. The presence of air and low boiling fractions tends to produce decomposition and discoloration. The non-uniform content of moisture within the feed stock produces an additional steam load in the fractionating tower and surging due to varying amounts of moisture.

An object of the present invention is to produce a separation of the fractions in fatty acid stock in a plurality of stages. Another object is to provide a method in which the stock is first stripped or fractionated at reduced pressure in the presence of steam and is then distilled at a lower pressure with or without the addition of heat to remove the major portion of the fatty acid therefrom. Another object is to provide a method in which at least a portion of the fatty acid vaporized in the initial treating stage is condensed, separated from the steam and returned as reflux. Other objects and advantages will appear as the specification proceeds.

The invention is illustrated, in a preferred embodiment, by the accompanying drawing in which the single figure represents, in a diagrammatical manner, apparatus suitable for carrying out the improved process.

The process may be described broadly, in connection with the apparatus, as follows. The feed stock containing fatty acids enters through pipe 10 into the heat exchanger, or other suitable form of heater. In the heat exchanger shown, a heating fluid such as Dowtherm may be passed through the inlet pipe 11 and out of the exchanger through the pipe 12, the pipes leading to a suitable external heating source (not shown). From the heat exchanger, the stock flows through pipe 13 into the stripping or fractionating tower at about the middle of its top section. As the stock flows downwardly, it meets a rising column of steam and vapors from the bottom of the tower, the steam and vapors aiding in the removal of air and moisture from the feed stock. At the same time, there is removed a small fraction, about five per cent, of low boiling fatty acids and other odoriferous substances. The stripping or fractionating tower described serves the function only of stripping vapors from the bottoms, but also of fractionating the rising column of vapors.

The steam, air and vapors thus withdrawn pass through the pipe 14 and surface condenser 15, the steam passing into the catchall through pipe 16 and the condensed fatty acid vapors passing downwardly through pipe 17 into the down tank. The steam in the catchall passes upwardly to a barometric condenser (not shown), by means of which, the pressure on the stripping tower is maintained at about 50 mm. Hg.

From the down tank, the condensate flows into a pump and about two-thirds of it is returned by the pump to the top of the stripping tower as reflux, the remaining one-third being removed as product.

The de-aerated and dried feed stock then flows through the pipe 18, which provides a seal 19, into the fractionating tower. Preferably, the top portion of the tower is maintained at a pressure of 2 mm. Hg and the pressure at the base is not greater than 32 mm. Hg. The bottom of the fractionating tower is heated by a Dowtherm Calandria type of base heater 20.

The vapors from the top of the tower pass off through pipe 21 and are condensed in the surface condenser 22. The major portion of the distillate from the condenser 22 is returned by the pump 23 through line 24 to the top of the fractionating tower as reflux. A smaller portion passes through cooler 25 to a point of recovery.

Bottoms from the tower flow through the pipe 26 into the flash drum or chamber where the vapors, after passing through the entrainment eliminators 27, pass through pipe 28 and are condensed in the surface condenser 29. The condensers 22 and 29 are connected by a manifold pipe 30 and a vacuum is maintained therein through the use of vacuum pumps and barometric condensers of well-known structure.

The flash drum is provided with a heating coil 31 connected with the Dowtherm pipes, suitable valves being placed in the lines permitting the coil to be used when desired. In ordinary practice, it is found unnecessary to heat the bottoms within the flash drum. The bottoms from the flash drum are withdrawn through pipe 32 and pumped through pipe 33 to a lower portion of the stripping tower. As the bottoms flow downwardly over the trays in the tower, they meet the ascending steam which strips the bottoms. The unvaporized portion of the bottoms is withdrawn through pipe 34 and passed through a cooler 35 to a point of recovery.

It will be noticed that the Dowtherm vapor or other suitable heating fluid is circulated through pipes 36 and 37 and through valve controlled pipes leading into the base heater 20 and the coil 31, the valves permitting the application of heat to be accurately controlled in the fractionating tower and in the flash drum.

The distillate which is recovered from the flash drum condenser 28 passes downwardly through pipe 38 and is then pumped through line 39 and cooler 40 to a point of recovery.

*Specific operation*

In order to illustrate the operation of the method, a specific example may be given as follows.

Five thousand pounds per hour of acidulated cotton seed foots containing from 80 per cent to 95 per cent of free fatty acids, (150° F.), enters the heat exchanger through the pipe 10 and is brought up to a temperature of 450° F. within the heat exchanger or heater. The stock enters the stripping tower and passes down over a series of stripping trays where it is met by a counter current of stripping steam, the pressure on the tower being maintained at approximately 50 mm. Hg.

The vapors pass off the stripping tower into the surface condenser 15 at the rate of 750 pounds per hour where they are condensed, the steam passing to the catchall and finally to the barometric condenser. Five hundred pounds of the condensed low boiling fatty acid is returned to the top of the stripping tower as reflux while 250 pounds is removed as product.

Within the stripping tower, the main portion of the feed stock flows downward over several stripping trays, being thoroughly stripped of non-condensable gases and air, moisture, and low boiling impurities.

The dried and de-aerated feed stock flows to the main fractionating tower through line 18. A pressure of 2 mm. Hg is maintained at the top of the tower while the pressure at the base is not substantially greater than 32 mm. Hg. The temperature at the base of the tower is maintained at about 482° F. Due to the fact that all of the unsaturated acid is still with the bottoms, the entire bottom mass boils at approximately the same temperature as the pure acid. No steam is required in the fractionating tower.

Six thousand pounds per hour of palmitric acid vapor issues from the top of the fractionating tower and is condensed in the surface condenser 22, 5000 pounds of the condensate being pumped back to the top tray of the fractionating tower as reflux and 1000 pounds being pumped to storage as finished product. The bottoms, which comprise about 70 to 80 per cent of the incoming stock, are drawn into the flash drum or chamber which is maintained at 2 mm. Hg or less, and allowed to vaporize, the latent heat of vaporization being furnished by the sensible heat carried in the stock, no additional heat being required. It will be apparent that in this operation these bottoms will be lowered in temperature by vaporization in the flash drum. Twenty-five hundred pounds of the unsaturated acids are removed as vapors in the flash chamber and condensed in the surface condenser 29 from whence it is pumped to storage.

The bottoms from the flash chamber contain considerable quantities of unsaturated acids, the actual percentage being controlled at such an amount as to insure a very pure unsaturated cut; in other words, I avoid getting down too close to the non-volatile matter.

The bottoms (approximately 1500 pounds per hour) are pumped to the top tray of the bottom section of the stripping tower where they are met with a countercurrent of super-heated stripping steam which removes the volatile fatty acids and carries them up to the top section of the tower where they are condensed with the feed stock. The non-volatile matter passes downward over the stripping trays and is removed from the base of the tower, the amount of super-heated steam being regulated so as to give the desired stripping results (approximately 400 pounds per hour). This amount can be varied over fairly wide limits as the pressure in the fractionating tower is from 50 to 70 mm. Hg.

It will be noted that in the flow of the feed stock through the stripping tower, fractionating tower, and flash drum, no pumps are employed. Tower nozzles, valves and other fittings are reduced in number and sources of leakage are reduced.

With the new method as described, it is possible to obtain an extremely high vacuum at low costs. The flash chamber and the fractionating tower can readily be operated at pressures of 1 to 2 mm. Hg without the compression of steam because no low boiling materials, water, air and non-condensable gases are present, the steam being eliminated from the fractionating tower and the feed stock being de-aerated and dried in the stripping tower.

Relatively low temperatures can be employed by virtue of the removal of the fractions in the stepwise method. The unsaturated fraction is removed by a flash distillation step where no heat is applied during the vaporization stage.

The fatty acid remaining in the bottoms is stripped by means of a high ratio of steam at a point in the system where the steam does not interfere with the high vacuum operation. Efficient and thorough stripping is accomplished at low temperatures. The stripped fatty acid is returned to the feed stock directly and with no heat loss, the latent heat contained in the acid being utilized for removing the moisture and low boiling material in the feed stock. It will be noted that the unsaturated fraction is heated only in the fractionating tower. Since the moisture is removed from the feed stock, there is no surging within the fractionating tower, as would otherwise be produced through a variation in the moisture content of the stock.

While in the foregoing description of the process, I have set forth certain steps as desirable, it will be understood that a number of such steps may be omitted or carried on in different sequences without departing from the spirit of my invention.

The phrase, "fatty acid-containing stock" as used herein and in the claims appended, is intended to include pure fatty acid mixtures and/or stock-containing fatty acids and glycerides, etc.

I wish it to be understood that I do not desire to be limited to the exact details of construction shown and described, for obvious modifications will occur to a person skilled in the art.

This application is a division of my copending now abandoned application Serial No. 424,434, filed December 16, 1941, which is in turn a division of my application Serial No. 298,722 filed October 9, 1939, now matured into Patent Number 2,322,056 granted June 15, 1943.

What is claimed is:

1. In a method of treating fatty acid stock containing a mixture of fatty acids of different boiling points, the steps of passing the stock through a fractionating zone, maintaining the fractionating zone at a subatmospheric pressure, introducing steam into the fractionating zone to strip low boiling point constituents from the stock, withdrawing the steam and fatty acid vapor from the fractionating zone, condensing the vapor, separating the condensate from the steam and returning at least a part of it to the fractionating zone, conducting higher boiling constituents in liquid form from the fractionating zone to a distillation zone, maintaining a subatmospheric pressure in the distillation zone lower than the pressure in the fractionating zone to vaporize at least a portion of the fatty acid in the distillation zone, and separately withdrawing from the distillation zone the vaporized fatty acid and the unvaporized liquid constituents.

2. In a method of treating fatty acid stock, the steps of heating the fatty acid stock, subjecting the heated stock to a subatmospheric pressure on the order of about 50 mm. mercury, passing steam through the stock at such pressure to strip low boiling constituents therefrom, separating higher boiling liquid constituents from vaporized lower boiling constituents, subjecting the separated liquid constituents to a lower subatmospheric pressure on the order of about 2 mm. mercury to vaporize at least a part of the fatty acids therein, and separating the vaporized fatty acids from the unvaporized residue.

3. A method of obtaining fatty acids of improved color and odor from fatty acid stock containing unwanted components having higher and lower boiling temperature ranges than said fatty acids by two successive stages of treatment, comprising fractionating the fatty acid stock in a fractionating zone with the application of heat and under reduced pressure to remove the lower boiling components, withdrawing the stock from the fractionating zone and distilling the stock at a temperature lower than the highest temperature maintained in the fractionating zone and under a pressure lower than that maintained in the lower part of the fractionating zone, to remove the fatty acids from the higher boiling components.

4. A method of obtaining fatty acids of improved color and odor from fatty acid stock containing unwanted components having higher and lower boiling temperature ranges than said fatty acids by two successive stages of treatment, comprising continuously fractionating the fatty acid stock with the application of heat and under reduced pressure to remove the lowest of the lower boiling components, and thereafter continuously distilling the fatty acids from which said lowest boiling components have been removed so as to vaporize the fatty acids at a temperature lower than that to which fatty acids were heated during the fractionation, to remove the fatty acids from the higher boiling components.

5. A method of obtaining fatty acids of improved color and odor from fatty acid stock containing unwanted components having higher and lower boiling temperature ranges than said fatty acids by two successive stages of treatment, comprising volatilizing and separating the lower boiling components from the fatty acids and the higher boiling components retained in liquid form by the application of heat and under reduced pressure, and thereafter, without heating the fatty acids to a temperature higher than that at which said lower boiling components were separated, volatilizing and separating the fatty acids from the higher boiling components retained in liquid form under a lower pressure such that the volatilization and separation of the fatty acids is effected at a temperature below that required for the volatilization and separation of the lower boiling components.

6. A method of obtaining fatty acids of improved color and odor from fatty acid stock containing unwanted components having higher and lower boiling temperature ranges than said fatty acids by two successive stages of treatment, comprising volatilizing the lowest of said lower boiling components from the fatty acids and the higher boiling components in a fractionating column maintained under reduced pressure, condensing said volatilized lower boiling components, returning a portion of the condensate to the column and collecting the balance, and thereafter treating all of the remaining stock to volatilize the fatty acids from the higher boiling components in a still maintained under a reduced pressure such that the fatty acids are volatilized at a temperature lower than that existing in the fractionating column, and condensing and collecting the fatty acids.

7. A method of obtaining fatty acids of improved color and odor, comprising subjecting fatty acid stock to continuous fractionation and distillation in two successive stages, said fractionation being accomplished by feeding the fatty acid stock in liquid form to a heated fractionating column maintained at a subatmospheric pressure to remove lower boiling constituents, and said distillation being accomplished thereafter by vaporizing the fatty acids at a lower temperature than the highest temperature in said column and at a lower pressure than the pressure in the lower part of said column to remove the fatty acids from the higher boiling constituents.

8. A method of obtaining fatty acids of improved color and odor in two successive stages of treatment, comprising introducing liquid fatty acid stock into a fractionating zone, maintaining a subatmospheric pressure in said zone, applying heat in said zone sufficient to vaporize and separate from said fatty acids constituents of said stock boiling at a temperature below that of wanted fatty acids, thereafter introducing the fatty acids into a distillation zone, maintaining a sub-atmospheric pressure in said distillation zone lower than that in the lower part of the fractionating zone and a temperature in said distillation zone lower than the highest temperature in said fractionation zone, and applying heat in the distillation zone sufficient to vaporize and separate the fatty acids from constituents of said stock having a higher boiling point than said fatty acids.

9. A continuous method of treating fatty acid stock comprising continuously introducing fatty acid stock in liquid form into a fractionating zone comprising a boiler and a fractionating column, maintaining a sub-atmospheric pressure in said zone, applying heat to said boiler to vaporize low boiling impurities from the stock in said fractionating column, continuously removing low boiling impurities including the lowest boiling impurities at the top of the fractionating column, continuously collecting fatty acids substantially free from low boiling impurities in said boiler, continuously transferring fatty acids and high boiling impurities from said boiler directly to a distillation zone comprising a still and a condenser maintaining a sub-atmospheric pressure in said distillation zone, lower than that in the boiler to vaporize the fatty acids from high boiling impurities at a temperature lower than the temperature in said boiler, continuously collecting the high boiling impurities in the still, and continuously collecting fatty acids substantially free from high and low boiling impurities in the condenser.

10. A continuous method of separating fatty acids from a fatty acid stock having unwanted components of higher and lower boiling ranges than said fatty acids, comprising continuously introducing liquid fatty acid stock into a fractionating column maintained under reduced pressure, heating the stock before introduction into the column, collecting the stock substantially free from lower boiling components in a boiler communicating with the bottom of the fractionating column, applying heat to the boiler to effect the vaporization of any lower boiling components in the fractionating column, continuously removing the lower boiling components adjacent the top of the fractionating column, condensing the vaporized components and refluxing a part of the condensate into the column, continuously transferring the fatty acid stock substantially free from lower boiling components directly to a still maintained at a pressure and temperature lower than that in said boiler, withdrawing the vaporized fatty acids substantially free from lower and higher boiling impurities adjacent the top of the still, and condensing the fatty acids so withdrawn.

11. The process recited in claim 10 in which the pressure in the boiler is not less than 30 mm., and the pressure in the still is not more than 4 mm.

12. A method of preparing a good grade of fatty acids for manufacturing soap from fatty acid stock obtained by splitting low grade fatty materials comprising subjecting the fatty acid stock to fractionation at an elevated temperature and subatmospheric pressure to remove the lowest boiling components, and thereafter without any intermediate heating of the remaining stock subjecting it to distillation at a lower temperature and pressure to remove the fatty acids from higher boiling components.

13. In a method for treating fatty acid stock containing fatty acids of different boiling points, the steps of continuously passing the fatty acid stock through a series of zones containing increasing proportions of relatively higher boiling fatty acids at progressively increasing subatmospheric pressures, passing steam through the stock during its passage through said zones to strip low boiling constituents therefrom, withdrawing unvaporized liquid components from the last of said zones separately from the vaporized lower boiling components, subjecting the withdrawn liquid components to a subatmospheric pressure lower than that in the last of said zones to convert the liquid components into fatty acid vapor free from the lower and higher boiling components and heavy liquid residue, separately removing the fatty acid vapor and the liquid residue, and condensing and collecting the fatty acid vapor as product separately from the lower and higher boiling components.

RALPH H. POTTS.

REFERENCES CITED

The following references are of record in the file of this patent:

UNITED STATES PATENTS

| Number | Name | Date |
| --- | --- | --- |
| 2,042,711 | Gensecke | June 2, 1936 |